US011409799B2

(12) United States Patent
Manoharan et al.

(10) Patent No.: US 11,409,799 B2
(45) Date of Patent: Aug. 9, 2022

(54) RECOMMENDATION OF SEARCH SUGGESTIONS

(71) Applicant: Roblox Corporation, San Mateo, CA (US)

(72) Inventors: Aswath Manoharan, Sunnyvale, CA (US); Nikolaus Sonntag, Foster City, CA (US); Shailendra Rathore, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 664 days.

(21) Appl. No.: 15/840,956

(22) Filed: Dec. 13, 2017

(65) Prior Publication Data

US 2019/0179921 A1   Jun. 13, 2019

(51) Int. Cl.
| | | |
|---|---|---|
| *G06F 16/36* | (2019.01) | |
| *G06F 16/903* | (2019.01) | |
| *G06F 16/9032* | (2019.01) | |
| *A63F 13/85* | (2014.01) | |
| *G06F 40/157* | (2020.01) | |
| *G06F 40/242* | (2020.01) | |
| *G06F 40/232* | (2020.01) | |

(52) U.S. Cl.
CPC ........ *G06F 16/90324* (2019.01); *A63F 13/85* (2014.09); *G06F 16/36* (2019.01); *G06F 40/157* (2020.01); *G06F 40/242* (2020.01); *G06F 40/232* (2020.01)

(58) Field of Classification Search
None
See application file for complete search history.

(56) References Cited

U.S. PATENT DOCUMENTS

| | | | |
|---|---|---|---|
| 8,122,011 B1 | 2/2012 | Garg et al. | |
| 8,412,699 B1 * | 4/2013 | Mukherjee | .......... G06F 16/2425 707/713 |

(Continued)

FOREIGN PATENT DOCUMENTS

EP   2624143   8/2013

OTHER PUBLICATIONS

WIPO, International Search Report and Written Opinion mailed for International application No. PCT/US2018/061766, dated Feb. 11, 2019, 17 pages.

*Primary Examiner* — Son T Hoang
(74) *Attorney, Agent, or Firm* — IP Spring

(57) ABSTRACT

A method and system is disclosed that generates a dictionary of terms comprising terms associated with games of a collaboration platform. The method further identifies search terms associated with previous search queries. The method compares the search terms with the terms of the dictionary to determine whether the search terms associated with the previous search queries are in the dictionary of terms. The method identifies a first set of the search terms that are candidates to receive search suggestions and a second set of the search terms that are to be the search suggestions based on the comparison. The method also generates a record that associates candidate search terms of the first set of the search terms with respective search suggestions of the second set of the search terms. The record is used to provide a search suggestion for a search term of a new search query.

20 Claims, 5 Drawing Sheets

(56) References Cited

U.S. PATENT DOCUMENTS

| | | | |
|---|---|---|---|
| 8,682,907 B1* | 3/2014 | Yang | G06F 16/3334 707/750 |
| 9,043,302 B1 | 5/2015 | Shimshoni et al. | |
| 2007/0054738 A1* | 3/2007 | Muir | G07F 17/3239 463/42 |
| 2007/0192318 A1 | 8/2007 | Ramer et al. | |
| 2008/0243738 A1* | 10/2008 | Rieman | G06F 15/16 706/18 |
| 2010/0153369 A1 | 6/2010 | Peoples et al. | |
| 2010/0185625 A1* | 7/2010 | Johnson | G06F 16/36 707/748 |
| 2012/0245715 A1* | 9/2012 | Short | A63F 13/35 700/91 |
| 2014/0019452 A1 | 1/2014 | He et al. | |
| 2014/0156693 A1 | 6/2014 | Kritt et al. | |
| 2014/0164387 A1 | 6/2014 | Chen et al. | |
| 2015/0120689 A1 | 4/2015 | Miao et al. | |
| 2015/0278692 A1* | 10/2015 | Milewski | G06F 16/9024 |
| 2016/0171108 A1* | 6/2016 | Chen | G06F 16/3322 707/767 |
| 2017/0270128 A1 | 9/2017 | Smith et al. | |

* cited by examiner

RECOMMENDATION OF SEARCH SUGGESTIONS

TECHNICAL FIELD

This disclosure relates to the field of information retrieval systems and, in particular, to generating search results based, at least in part, on historical data associated with games and game objects of a collaboration platform.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

DESCRIPTION OF DRAWINGS

Various implementations of the disclosure will be understood more fully from the detailed description given below and from the accompanying drawings of various implementations of the disclosure.

DETAILED DESCRIPTION

Figure 1:
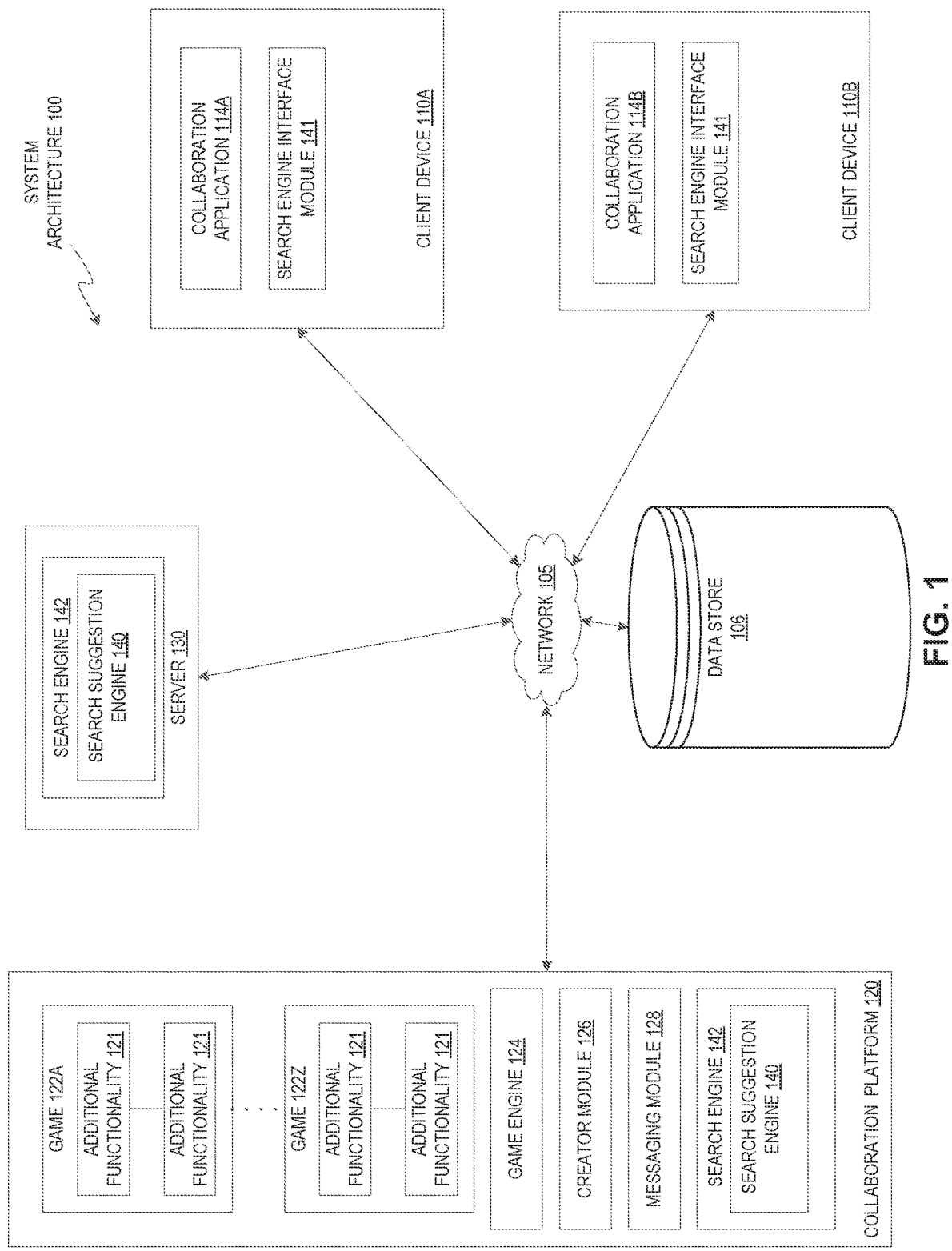
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various gaming items, send electronic messages to one another, and so forth. Users of a collaboration platform may play games (e.g., playing users) with characters or create games (e.g., creating users) with developmental tools via the collaboration platform. In a collaboration platform, users may search for content items, such as games or game objects, using a search engine. For example, in a gaming platform a playing user may search for a game using a search term. In some platforms, the search results provided to users may be irrelevant to the desired information. Responsive to providing irrelevant search results, users may become frustrated with the platform, spend less time on the platform, or leave the platform all together.

Searching for relevant search results may be challenging at least because some of the words in the search index (e.g., corpus) may be user-generated and prone to misspellings. Users that submit search queries using misspelled words may generate matches with misspelled words in the search index. Even though the search queries with misspelled words generate matches, the returned results are likely to be irrelevant to the user. To provide more relevant search results, search engines may provide search suggestions. A search suggestion may recommend an alternative search term that may provide more relevant search results. For similar reasons, some platforms may have challenges in providing relevant search suggestions. For example, titles of many games (e.g., "Bloxburg") may not part of the English language. It may be challenging to determine if a search suggestion is warranted (e.g., whether the search term is misspelled or a title that is not part of the English language), and identify relevant search suggestions that will provide relevant search results.

Aspects of the disclosure address the above-mentioned and other challenges by identifying search terms that are candidates to receive search suggestions and identifying other search terms that are to be search suggestions. In some implementations, the search suggestions and the candidates for search suggestions may be identified from frequently used search terms that are associated with previous search queries. The search terms of the previous search queries may be compared to a customized dictionary of terms. The custom dictionary may include words from one or more authoritative dictionaries, words from titles of games that are not in the authoritative dictionaries, words that may be frequently used in the platform but not in the authoritative dictionaries. Frequently used search terms of previous search queries that are found in custom dictionary may be used as search suggestions. Frequently used search terms of previous search queries that are not found in custom dictionary may be used as candidates for search suggestions. A similarity may be determined between the search suggestions and the candidates for search suggestions. A search suggestion and a respective candidate for search suggestion (e.g., search term) with a high similarity score are mapped or associated with one another in a record. Responsive to a new search query, the search term of the new search query is compared to the candidates for search suggestions in the record. If a match is found, the search suggestion(s) associated with the particular candidate for search suggestion may be provided to the user in response to the new search query.

Accordingly, aspects of the disclosure identify and provide relevant search suggestions and search results in response to a search query. Providing relevant search suggestions and search results increases the efficiency of a collaboration platform. In addition, conventional search techniques may result in providing the user with irrelevant search suggestions and search results, which may lead to additional operations, such as additional search queries and the providing of additional search results. By providing relevant search suggestions, overall network bandwidth usage is reduced and results in a more efficient use of computing (processing) resources and in improved user experience.

It may be noted that a collaboration platform described as a gaming platform herein is provided for purposes of illustration, rather than limitation. A collaboration platform may be one or more of numerous platforms, such as a social networking platform, purchasing platform, a messaging platform, creation platform, and so forth. It may be further noted that aspects of the disclosure are illustrated using an example of a gaming platform and games. It may be noted that aspects of the disclosure may apply to search engines and search suggestions generally.

FIG. 1 illustrates an example system architecture 100, in accordance with one implementation of the disclosure. The system architecture 100 (also referred to as "system" herein)

includes client devices 110A and 110B, a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system or be part of another system or platform. The server 130 may include search engine 142. In implementations, search engine 142 may include search suggestion engine 140. In some implementations, search suggestion engine 140 may not be included in search engine 142 (e.g., separate engines the work together using function calls).

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In one implementation, collaboration platform 120 may be a gaming platform, such as an online gaming platform. For example, the gaming platform may provide single-player or multi-player games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122. A game 122 can include an electronic file that can be executed or loaded using software, firmware or hardware configured to present the game content (e.g., digital media item) to an entity. In some implementations, collaboration platform 120 hosts games 122 and allows users to interact with the games 122 using collaboration application 114 of client devices 110. Users of collaboration platform 120 may play, create, interact with, or build games 122, or create and build contents of games 122. For example, users may create characters, decoration for the characters, one or more virtual environments for an interactive game, or build structures used in a game 122, for example. In implementations, users may buy, sell, or trade game objects, such as in-platform currency (e.g., virtual currency), with other users of the collaboration platform 120. In implementations, collaboration platform may transmit game content to collaboration applications 114. Game content (also referred to as "content" or "content item" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user (s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features. In some implementations, an instance of game engine 124 may be included on client devices 110 (not shown).

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (also referred to as "items" herein) may refer to objects that are used, created, shared or otherwise depicted in games 122 of the collaboration platform 120. For example, game objects may include a part, model, character, tools, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, collaboration platform 120 may include search engine 142 and search suggestion engine 140. For purposes of illustration, rather than limitation, search engine 142 is described as allowing users to search for content items of or related to collaboration platform 120. In other implementations, aspects of the disclosure may be used to search information generally, such as information of the World Wide Web (WWW) or other information resources, for example. In some implementations, a user may request information using a search query. A search query may refer to a request or query for information where a user supplies a search term to a search engine 142 to satisfy the request for information. A search term may refer to an input or term entered as part of a search query and used by the search engine 142 to provide relevant information (e.g., search results). A term may refer to a word, a character, a representation (e.g., in the form of an icon, such as an emoji), or a combination thereof. It may be noted that a search term, such as a search term associated with a search query, may include one more terms. For example, a search term may be "Tycoon" or "The tycoon game with multiplayer." The search engine may retrieve and return search results to the user. The search results may include relevant information associated with the search term.

For example, in searching for a game 122 a user may enter the search term "Tycoon" into a user interface, such as search engine interface module 141 of client device 110. The search term may be sent via network 105 to search engine 142 of collaboration platform 120. The search engine 142 may use a search index to find information relevant to the search term. A search index may refer to information that is collected, parsed and stored to help facilitate accurate information retrieval. For instance, the search index may store the title and other metadata related to a particular game or game object (e.g., meta-keywords, description of the game or game object, user comments related to the game, etc.).

In one implementation, search engine 142 or search suggestion engine 140 may use similarity techniques that compare the similarity between two or more terms and produce a similarity score indicative of the similarity between two or more terms. For example, a user may submit a search query containing a search term to the search engine 142. Search engine 142 may use a similarity evaluation technique to compare the search term to terms associated with the games (e.g., metadata) in the search index and determine similarity scores indicative of the similarity between the search term and the metadata associated with the games. In implementations, similarity scores may be compared to a similarity threshold. For similarity scores that are greater than or equal to the similarity threshold, the games associated with the metadata may be retrieved or selected. The selected games (or identifiers of the selected games) may be sent to the user as search results for the search query. For instance, responsive to finding one or more games that are relevant to the search term, "Tycoon" (e.g., the tile or description contains the word "tycoon" or variation thereof) using similarity techniques, links to or identifiers of one or more of the relevant games may be sent to client device 110. It may also be noted that similarity techniques may assign similarity scores (e.g., probability) to search results that indicate a probability that a search result is similar to a search term. In some implementations, the similarity scores may be on a scale from 0 to 1, where 0 indicates no similarity and 1 indicates an exact match. It may be noted that the thresholds described herein may be the same or different and may be determined by an administrator on a per application basis.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web browser that can access, retrieve, present, and/or navigate content (e.g., virtual character in a virtual environment, etc.) served by a web server. In another example, collaboration application 114 may be a native application. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, search engine 142 and search suggestion engine 140 are described as implemented on collaboration platform 120. In other implementations, search engine 142 or search suggestion engine 140 may in part or wholly be implemented on client device 110. In other implementations, search engine 142 or search suggestion engine 140 may in part or wholly be implemented on server 130. In other implementations, search engine 142 or search suggestion engine 140 operating on one or more of client device 110, server 130, or collaboration platform 120 may work in conjunction to perform the operations described herein. Although implementations of the disclosure are discussed in terms of collaboration platforms, implementations may also be generally applied to any type of social network providing connections between users.

In implementations, search engine interface module 141 may allow a user to interface with search engine 142 of collaboration platform 120. In implementations, search engine interface module 141 of client devices 110 may be a separate application or part of collaboration application 114 (e.g., add-in).

In implementations, search suggestion engine 140 may be used to provide search suggestions to users. A search suggestion may refer to a search term recommended or suggested to the user in response to a search query using another search term. A search suggestion may also refer to a search term recommended or suggested to the user in response to a search query using another search term, where the recommended search term (rather than the search term of the search query) is used to provide search results (e.g., also referred to as "auto correct" herein). For instance, a user may type in search terms in search engine interface module 141 and concurrent with the user typing, one or more search suggestions may be presented to the user as suggested search terms. A search suggestion may also refer to a search term recommended or suggested to the user in response to a search query using another search term, where the original search term (rather than recommended or suggested search term) is used to provide search results and the recommended search term is provided as a recommendation (also referred to as "recommended search terms" or "alternative search terms" herein). In an example of alternative search terms, the user may enter a search term and submit a search query to collaboration platform 120. Search engine 142 in collaboration with search suggestion engine 140 may return search results for the search term and also suggest search suggestions for alternative search terms. For example, the user may submit a search query with the search term "Tuykoon." In response to the search query, search engine 142 in conjunction with search suggestion engine 140 may return search results for "Tuykoon" and the search suggestion "did you mean: Tycoon." In an example of an auto correct, in response to the search query using the search term "Tuycoon," search engine 142 in conjunction with search suggestion engine 140 may automatically return search results for "Tycoon" and the search suggestion "searching instead for: Tycoon."

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
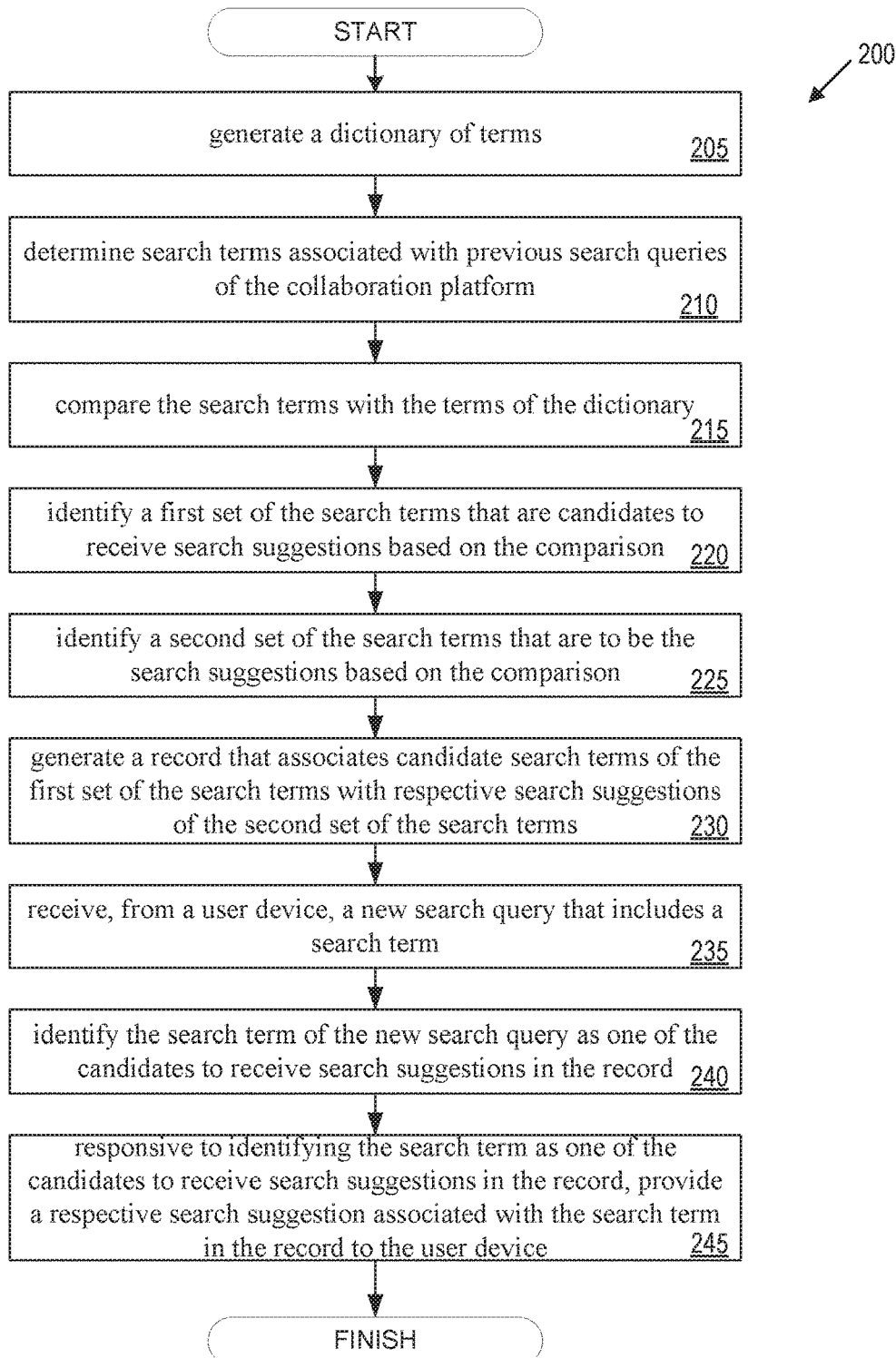
FIG. 2 is a flow diagram illustrating a method for identifying and providing a search suggestion, in accordance with implementations of the disclosure.

FIG. 2 is a flow diagram illustrating method 200 for identifying and providing a search suggestion, in accordance with implementations of the disclosure. Method 200 may be performed by processing logic that includes hardware (e.g., circuitry, dedicated logic, programmable logic, microcode), software (e.g., instructions run on a processing device to perform hardware simulation), or a combination thereof. In some implementations, search suggestion engine 140 executing at collaboration platform 120, client device 110A, client device 110B or combination thereof may perform some or all the operations. In some implementations, search suggestion engine 140 in collaboration with search engine 142 may perform some or all the operations. Components of FIG. 1 may be used to help illustrated method 200. It may be appreciated that the in some implementations, method 200 may include the same, different, fewer, or greater operations performed in any order.

In some implementations, the terms of titles of games of a gaming platform, such as collaboration platform 120, are often not words of a particular language, and may not be found in authoritative language dictionaries (e.g., other dictionaries of a particular language). A dictionary of terms (also referred to as a "custom dictionary") may be generated to include words from other dictionaries of a particular language as well as terms from the titles of popular games. Frequently used search terms in previous search queries may be identified. The dictionary of terms may be used as a resource to identify search terms from the frequently used search terms of the previous search queries that can be used as search suggestions (e.g., search terms found in the custom dictionary) and identify search terms that can be used as candidates to receive search suggestions (e.g., search terms not found in the custom dictionary). A record may be generated that associates search suggestions (e.g., "Tycoon") with other search terms that are candidates to receive search suggestions (e.g., "Ticoon," "Tiekoon," "Tyecoon," etc.). For example, candidate to receive search suggestions "Ticoon" is associated or mapped to the search suggestion "Tycoon." When a new search query is received, such as a search query submitted by as user of collaboration platform 120, the search term of the search query may be searched against the record. If the search term of the user's search query is found in the record as a candidate to receive a search suggestion, search suggestion engine 140 may identify the associated search suggestion identified in the record, and the identified search suggestion may be provided to the user. If the search terms of the user's search query are not found in the record as candidates to receive search suggestions, the search engine 142 may provide results to the user's search query based on the search terms in the search query and not provide a search suggestion.

Method 200 begins at block 205 where processing logic generates a dictionary of terms.

In one implementation, the dictionary of terms may include words from one or more dictionaries of a particular language (also referred to a "language dictionary" or "authoritative dictionary"). For example, the words from one or more of Collins English Dictionary™ Merriam-Webster's Dictionary™, etc., may be included in the dictionary of terms. In some implementations, some words from the one or more dictionaries of a particular language may be removed (e.g., scrubbed). For example, words that may be inappropriate for children (e.g., under 13 years of age), such as swear words, may be removed and not included in the dictionary of terms.

In some implementations, the dictionary of terms may include terms that are often used on the collaboration platform 120 but are not found in the authoritative dictionary. For example, terms such as NFL™, Robux™, Roblox™, and others may be included in the dictionary of terms.

In some implementations, the dictionary of terms may also include terms associated with games of a collaboration platform 120. For example, the dictionary of terms may include metadata, such as game titles associated with games of the collaboration platform 120, In an implementation, generating the dictionary of terms includes identifying a set of the games of the collaboration platform 120, identifying the terms in the titles of the set of games, and adding the terms of the titles to the dictionary of terms. It may be noted that the set of games may be some or all the games in the collaboration platform 120.

In some implementations, the games whose titles are used to populate the dictionary of terms may be filtered to identify games that are relevant to the user. For example, the titles of popular games may be included in the dictionary of terms. In some implementations, including the titles of popular games may help ensure that the titles of popular games are includes as search suggestions, and excluding titles of unpopular games may ensure that the titles of unpopular games are not included as search suggestions.

In some implementations, identifying the set of games that are relevant includes determining a frequency each game of the collaboration platform has been played by users over a time period. For example, the frequency may indicate the number of times a particular game of the collaboration platform 120 has been played over the last 30 days. It may be noted that other metrics may be used to determine a set of games that are relevant. For instance, another metric may include the number of minutes a particular game of the collaboration platform 120 has been played during a time period (e.g. by all users). Time period, as described herein, may be any period of time (e.g., hours, days, weeks, months, etc.).

In implementations, the frequency of each game may be compared to a first threshold frequency. Responsive to the frequency of a respective game exceeding or being equal to the first threshold frequency, the respective game is added to the set of relevant games. Responsive to the frequency of a respective game not exceeding the first threshold frequency, the respective game is not added to the set of relevant games. As noted the titles of the set of relevant games may be added to the dictionary of terms. In some implementations, the relevant titles may be updated at intervals (e.g., daily) and the dictionary of terms may include some percentile of the most popular games.

At block 210, processing logic determines a group of search terms associated with previous search queries of the collaboration platform 120. All or some of search terms of the previous search queries may be used as search suggestions or candidates to receive search suggestions, as further described below. It may be noted that previous search queries may be search queries that have been previously submitted by users of the collaboration platform 120.

In some implementations, the search terms of previous search queries may be filtered into a group to identify relevant search terms, such as commonly used search terms or top search terms. In some implementations, filtering the search terms of previous search queries into a group (rather than use all the search terms within a particular period) may help ensure that relevant search terms are included as search suggestions or candidates to receive search suggestions. In some implementations, filtering the search terms to identify a group of relevant search terms may include determining a frequency of each of the search terms associated with the previous search queries over a second time period. For example, the frequency may indicate the number of times a particular search term (e.g., "The Tycoon") has been used in previous search queries over a time period (e.g. last 30 days). The frequency of each of the search terms associated with previous search queries may be compared to a second threshold frequency. In response to determining the frequency of a respective search term of the previous search query is below the second threshold frequency, the respective search term may be removed from the group of relevant search terms associated with the previous search queries. In response to determining the frequency of a respective search term of the previous search query is equal to or exceeds the second threshold frequency, the respective search term may be added (or kept) to the group of relevant search terms associated with the previous search queries.

At block 215, processing logic compares the search terms with the terms of the dictionary to determine whether the relevant search terms associated with the previous search queries are in the dictionary of terms. In implementations, the comparison may identify if the relevant search term is found in the dictionary of terms or not found in the dictionary of terms (e.g., exact match). In implementations, in cases where a search term has multiple terms (e.g., "Tycoon III"), if all the terms of the search term are found in the dictionary the search term is regarding as "found" in the dictionary. If one or more of the terms of the search term are not found in the dictionary the search term is regarded as "not found" in the dictionary.

At block 220, processing logic identifies (e.g., from the group of relevant search terms) a first set of the search terms (associated with previous search queries) that are candidates to receive search suggestions (also referred to as "candidates" or "candidates for search suggestions" herein). In implementations, responsive to determining that a first respective search term of the search terms associated with the previous search queries is in the dictionary of terms, processing logic adds the first respective search term to the first set of the search terms (candidates for search suggestions). In some implementations, additional candidates for search suggestions may be search terms of the previous search queries that are found in the dictionary of terms but do not produce a threshold amount of search results (e.g., did not produce any search results).

It may be noted that identifying the first set of search terms and the second search terms may be performed as a single operation or in multiple operations (e.g. block 220 and 225). It may also be noted that the group of relevant search terms (e.g., associated with previous search queries and compared to terms of the dictionary) from which the candidates for the search suggestions and the search suggestions are identified may be different groups or relevant search terms. For instance, the first group of relevant search terms from which the candidates for the search suggestions are identified may be the top 500 search terms of previous search queries. The second group of relevant search terms from which the search suggestions are identified may be the top 5000 search terms of previous search queries (e.g., overlapping groups).

At block 225, processing logic identifies (e.g., from the group of relevant search terms) the second set of search terms (also referred to as "search suggestions" herein) that are to be the search suggestions. In some implementations, responsive to determining that a second respective search term of the previous search queries is not in the dictionary of terms, processing logic adds the second respective search term to the second set of the search terms (e.g., search suggestions).

In some implementations, search suggestions of the second set of search terms may further be filtered using a validation operation. The validation operation may ensure that the search suggestions (search terms thereof) return relevant search results, such as popular games. In some implementations, validating the search suggestions includes removing search terms (search suggestions) from the second set of search terms that are not validated and keeping search terms of the second set of search terms that are validated.

In an implementation, to validate the search suggestions, processing logic submits a search query comprising a respective search term of the second set of the search terms. Processing logic may receiving a search result to the search query where the search result identifies one or more games of the collaboration platform. Processing logic may identify the number of positive user feedback actions associated with the one or more games identified in the search results. A positive user feedback may be feedback from a user that indicates that the user approved a content item, such as a game (e.g., clicking a "like" input, star rating, favorited, comments, etc.). In implementations, the number of positive user feedback actions associated with a game may be compared to a second threshold number. Responsive to determining the number of positive user feedback actions associated with the one or more games of the search result is below the second threshold number, processing logic removes the respective search term from the second set of the search terms. Responsive to determining the number of positive user feedback actions associated with the one or more games of the search result is greater than or equal the second threshold number, processing logic keeps the respective search term as a search suggestion.

It may be noted that other metrics in addition to or in lieu of positive user feedback may be used to validate search suggestions. It may be noted that any metrics may be used that help determine that the search results associated with a search term are relevant to a user. In one example, the number of times a particular game of the search results has been played with the last 30 days (e.g., or other time period) may be compared to another threshold. If one or more of the games of the search results meet or exceed the threshold, the corresponding search term is kept as a search suggestion of the second set of search terms; otherwise the search term may be discarded as a search suggestion.

At block 230, processing logic generates a record that associates candidate search terms of the first set of the search terms with respective search suggestions of the second set of the search terms. The record is used to identify a search suggestion for a new search query, where the new search query includes a candidate search term located in the record.

In implementations, to generate the record that associates the candidate search terms of the first set of the search terms with the respective search suggestions of the second set of the search terms, processing logic determines similarity scores that indicated a similarity between the candidate search terms of the first set of the search terms with the respective search suggestions of the second set of the search terms. Processing logic may compare the similarity scores to a threshold similarity score. Responsive to determining that a similarity score associated with a particular candidate search term of the first set of the search terms and a particular respective search suggestion of the second set of the search terms exceeds or is equal to the threshold similarity score, processing logic may associate the particular candidate search term with the particular respective search suggestion in the record. Responsive to determining that a similarity score associated with a particular candidate search term of the first set of the search terms and a particular respective search suggestion of the second set of the search terms is less than the threshold similarity score, processing logic may not associate the particular candidate search term with the particular respective search suggestion in the record.

For example, a candidate for a search suggestion "Typan" may be compared to search suggestions "Bloxburg" and "Typhoon." The similarity score for "Typan" and "Bloxburg" may be low, and "Typan" and "Bloxburg" will not be associated in the record. The similarity score for "Typan" and "Typhoon" may be high, and "Typan" and "Typhoon" may be associated in the record. The association in the record may include an identifier or other construct that identifies that the candidate for search suggestion, "Typan" and search suggestion, "Typhoon" is associated in the record. It may be noted that a particular candidate for search suggestions may have zero, or one or more associated search suggestions.

At block 235, processing logic receives, from a user device, a new search query including a search term. For instance, the user may submit a search query with a search term via search engine interface module 141 of client device 110. At block 240, processing logic identifies the search term of the new search query as one of the candidates to receive the search suggestions in the record. For example, processing logic may compare the search term of the new search query with the candidates for search suggestion located in the record to determine a match (e.g., exact match) or similarity. If there is a match, processing logic identifies the candidate to receive a search suggestion and the associated search suggestion(s) in the record. At block 245, responsive to identifying the search term as one of the candidates for search suggestions, processing logic provides a respective search suggestion associated with the search term in the record to the user device. In implementations, if the search term of the new query is not found in the record, processing logic does not provide a search suggestion to the query. If the search term of the new search query is not found in the record, processing logic may use the search term of the new query to perform a search.

In some implementations, search suggestions may be provided in various ways. In one implementation, in response to a new search query where a search suggestion has been identified in the record, search results may be provided for the search term of the new query as well as the search suggestion informing the user of an alternative search term (e.g., "Did you mean to search: Tycoon?"). In another implementation, in response to a new search query where a search suggestion has been identified in the record, search results may be provided for the search term of the search suggestion as well as an indication that an alternative search term was used to perform the search (e.g., "Searching instead for: Tycoon").

In some implementations, to determine which type (as described above) of search suggestion to provide, processing logic compares a number of search suggestions associated with the candidate for search suggestions in the record to a first threshold number. Responsive to determining the number of search suggestions associated with the candidate to receive search suggestions in the record is less than or equal to the first threshold number, processing logic replaces the search term of the new search query with the respective search suggestion of the record and provides results to the search query based on the search term of the respective search suggestion (see for example FIG. 3A). In implementations, responsive to determining the number of search suggestions associated with the candidate for search suggestions in the record is greater than the first threshold number, processing logic provides the respective search suggestion as a suggestion to replace the search term of the search query. Search results for the search term in the new search query may also be returned to the user.

For example, a search term of a new search query is identified as a candidate for search suggestions in the record. The candidate for search suggestions may have one or more associated search suggestions in the record. If the first threshold number is 1, for example, responsive to identifying 1 search suggestion associated with the candidate for search suggestions, search suggestion engine 140 may provide search results for the search term of the search suggestion, rather than for the search term of the new search query. Responsive to identifying two or more search suggestions associated with the candidate for search suggestions, search suggestion engine 140 may provide search results for the search term of the new query, and provide the search suggestions as a recommendation (e.g., "Did you want to search XXX or YYY instead").

In some implementations, to determine which type of search suggestion to provide (e.g., auto correct or suggest an alternative search term), a variety of different approaches may be implemented. For example, a search term of a new search query is identified as a candidate for search suggestions in the record. Processing logic may identify the number of times the candidate for search suggestions was searched during a given time period (e.g., last 7 days) and the number of times the associated search suggestion(s) was searched during the same time period. If the number of times the candidate for search suggestions was searched during a given time period (e.g., last 7 days) is greater than (or equal to) the number of times the associated search suggestion was searched during the same time period, processing logic may search the search term of the original query. If the number of times the candidate for search suggestions was searched during a given time period is slightly less than any of the associated search suggestion (e.g., within a first threshold), processing logic may provide the alternative search term (e.g., associated search suggestion). If the number of times the candidate for search suggestions was searched during a given time period is much less than any of the associated search suggestion (e.g., exceeding a first threshold and within a second threshold), processing logic may auto correct the search term and provide search results for the new search term. In some implementations where multiple suggestions are associated with a candidate for search suggestions, the search suggestion that was searched the greatest number of times during a time period may be used as the search term either in an auto correct operation or an alternative search term.

In another implementation, to determine which type of search suggestion to provide (e.g., auto correct or suggest an alternative search term), processing logic may use any other metric, such a click-through rate (CTR) (e.g., indicative of a rate a user selects a search term, such as a search suggested, in view the number of times a search term is provided to the users). For example, if the CTR for the candidate for search suggestions is greater (or equal to) the associated search suggestions, processing logic may search for the search term in the original search query. If the candidate for search suggestions has a slightly lower CTR (e.g., within a first threshold) than the associated search suggestions, processing logic may suggest one of the alternative search terms. If the candidate has a much lower CTR (e.g., exceeding a first threshold and within a second threshold) than the associated search suggestions, processing logic may use any of the associated search suggestions in an auto correct operation. In some implementations where multiple suggestions are associated with a candidate for search suggestions, the search suggestion with the highest CTR may be used as the search term in either an auto correct operation or and an alternative search term.

In another implementation, to determine which type of search suggestion to provide (e.g., auto correct or suggest an alternative search term), processing logic may determine the number of characters in the candidate for search suggestions. If the number of characters in the candidate for search suggestions is below a threshold, processing logic may provide an alternative search term. If the number of characters in the candidate for search suggestions is greater than or equal to the threshold, processing logic may perform other implementations that determine the type of search suggestion to provide as described herein.

In some implementations, to determine which type of search suggestion to provide (e.g., auto correct or suggest an alternative search term), certain candidates for search suggestions may be flagged to always be provided as an auto correction or an alternative search term. In still some implementations, if a candidate for search suggestions is associated with a search suggestions that matches (e.g., exact match) a title of a popular or relevant game (as described herein), processing logic may provide the search suggestion as an auto correct. It may be noted that any combination of the implementations or any part of the implementations to determine which type of search suggestion to provide may be combined in other implementations.

Figure 3A:
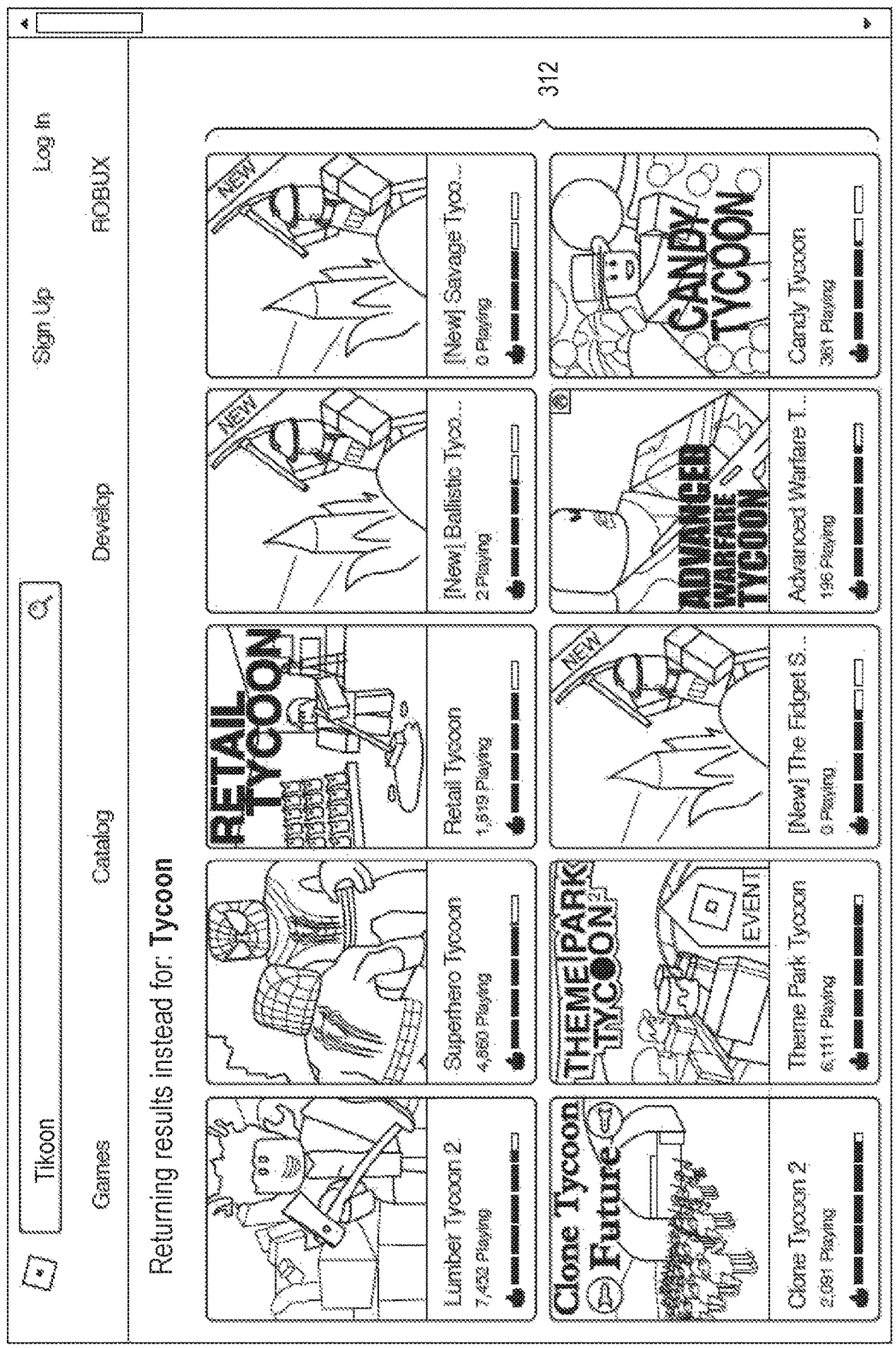
FIG. 3A illustrates a user interface showing search results provided in view of a search suggestion, in accordance with some implementations of the disclosure.

FIG. 3A illustrates a user interface showing search results provided in view of a search suggestion, in accordance with some implementations of the disclosure. User interface 300 shows the search results 312 for a search query using the search term, "Tikoon." Search results 312 have been provided for a search term of a search suggestion "Tycoon" associated with the candidate for search suggestion, "Tikoon." (e.g., auto correct the query) As illustrated, the search results 312 include identifiers (e.g., images) of the respective games. In implementations, a user may select a game (e.g., game identifier) from the search results 312 to access the game from collaboration platform 120. In some implementations, the games (e.g., game identifiers) may be displayed in a ranked order. For example, the games may be displayed top, left to right, bottom, left to right in descending ranking order (e.g., 1 through 10 rank).

Figure 3B:
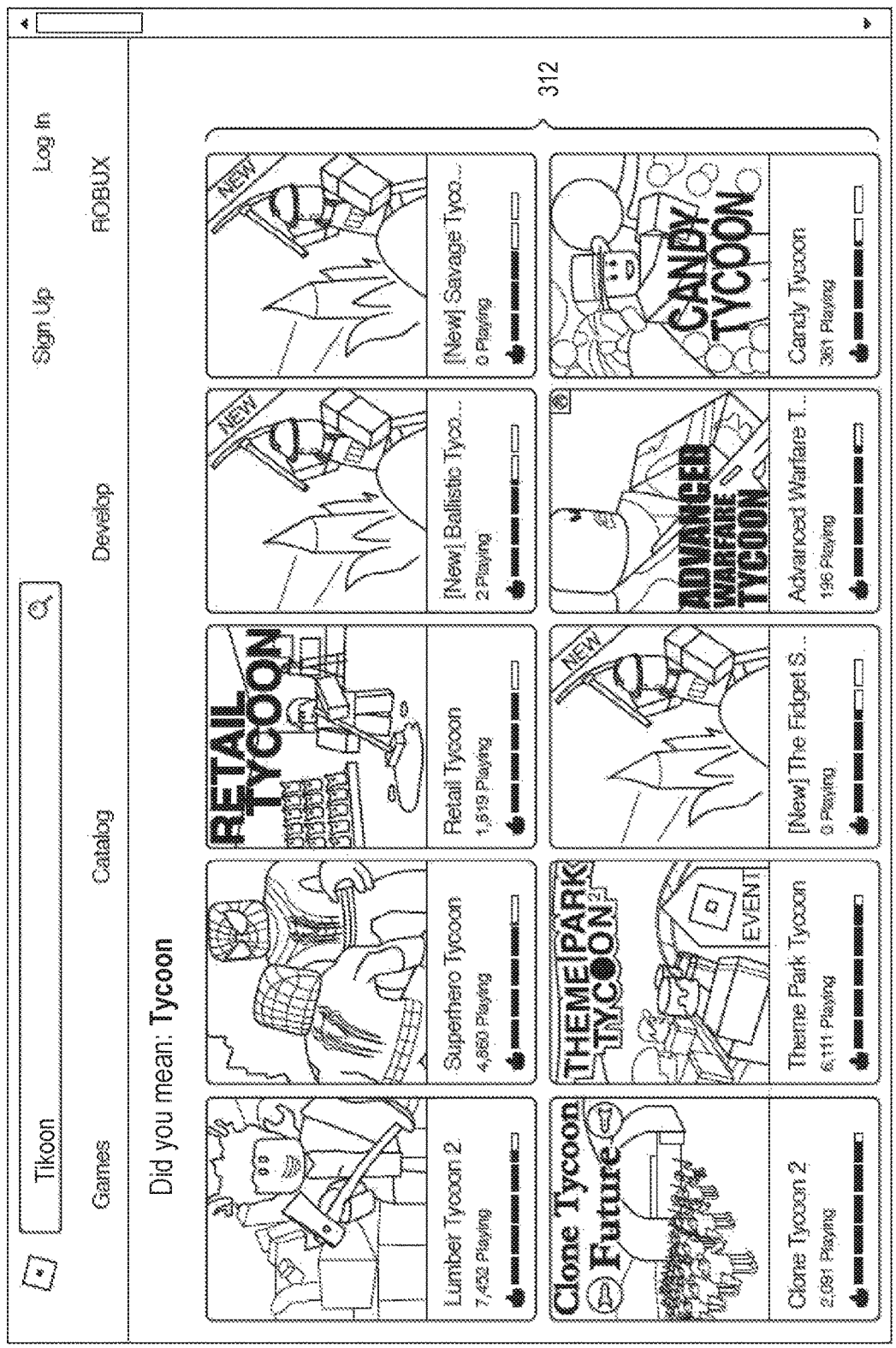
FIG. 3B illustrates a user interface showing search results provided in view of a search suggestion, in accordance with some implementations of the disclosure.

FIG. 3B illustrates a user interface showing search results provided in view of a search suggestion, in accordance with some implementations of the disclosure. User interface 300 shows the search results 312 for a search query using the search term, "Tikoon" and the alternative search term, "Tycoon" (e.g., "Did you mean: Tycoon"). In implementations, a user may select "Tycoon" to search for games using the alternative search term "Tycoon." It may be noted that although search results 312 are shown to be the same as in FIG. 3A, in some instances the search results may be different since the search term "Tikoon," rather than "Tycoon," is used to query the search engine.

Figure 4:
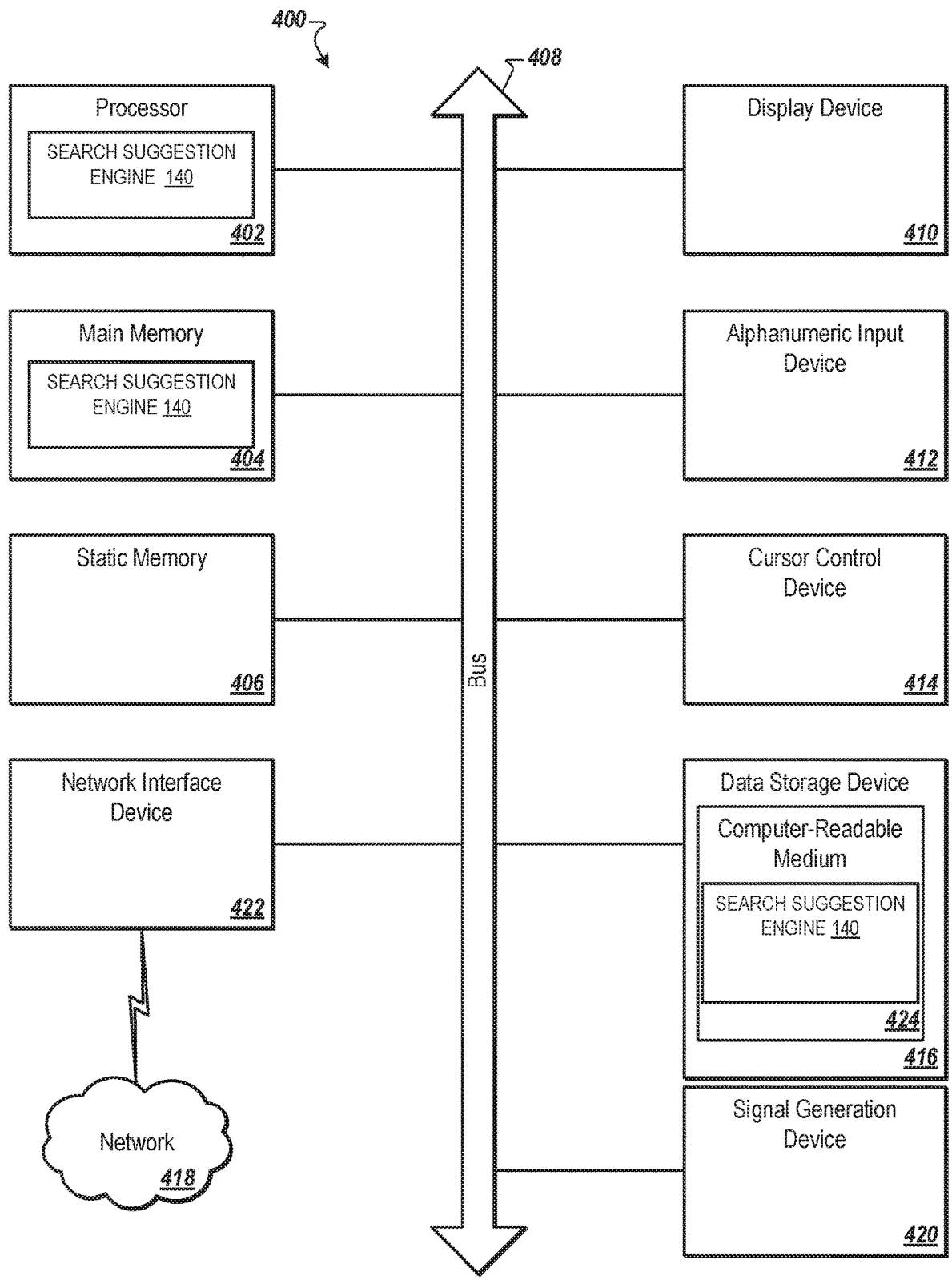
FIG. 4 is a block diagram illustrating an exemplary computer system, in accordance with implementations of the disclosure.

FIG. 4 is a block diagram illustrating an exemplary computer system 400, in accordance with implementations. The computer system 400 executes one or more sets of instructions that cause the machine to perform any one or more of the methodologies discussed herein. Set of instructions, instructions, and the like may refer to instructions that, when executed computer system 400, cause computer system 400 to perform one or more operations of search suggestion engine 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and the search suggestion engine 140 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored the sets of instructions of the system architecture 100 and search suggestion engine 140 embodying any one or more of the methodologies or functions described herein. The sets of instructions of the system architecture 100 and search suggestion engine 140 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying," "generating," "comparing," "providing," "receiving," "replacing," "adding," "removing," "validating," "submitting," "associating," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

We claim:

1. A computer-implemented method comprising:
generating a dictionary of terms comprising terms associated with games of a collaboration platform, wherein generating the dictionary of terms further comprises:
identifying a set of the games of the collaboration platform, wherein identifying the set of the games of the collaboration platform comprises:
determining a frequency each of the games has been played by users of the collaboration platform over a first time period;
comparing the frequency of each of the games has been played over the first time period to a first threshold frequency; and
responsive to the frequency of a respective one of the games exceeding the first threshold frequency, adding the respective game to the set of the games;
identifying terms in titles of the set of the games; and
adding the terms in the titles of the set of the games to the dictionary of terms;
identifying a plurality of search terms associated with previous search queries of the collaboration platform;
comparing the search terms with the dictionary of terms to determine whether the search terms associated with the previous search queries are in the dictionary of terms;
identifying a first set of the search terms that are candidates to receive search suggestions and a second set of the search terms that are to be the search suggestions based on the comparison; and
generating a record that associates candidate search terms of the first set of the search terms with respective search suggestions of the second set of the search terms, wherein the record is used to provide a search suggestion for one or more new search terms of a new search query.

2. The computer-implemented method of claim 1, further comprising:
receiving, from a user device, the new search query comprising the one or more new search terms;
identifying the search term of the new search query as one of the candidates to receive the search suggestions in the record; and
responsive to identifying the search term as one of the candidates to receive search suggestions in the record, providing a respective search suggestion associated with the search term in the record to the user device.

3. The computer-implemented method of claim 2, wherein providing the respective search suggestion associated with the search term in the record to the user device comprises:
comparing a number of search suggestions associated with the candidate search terms to receive the search suggestions in the record to a first threshold number;

responsive to determining the number of search suggestions associated with the candidate to receive search suggestions is less than or equal to the first threshold number,
  replacing the search term of the new search query with the respective search suggestion of the record, and providing results to the search query based on the respective search suggestions; and
responsive to determining the number of search suggestions associated with the candidate to receive the search suggestions is greater than the first threshold number, providing the respective search suggestion as a suggestion to replace the search term of the search query.

4. The computer-implemented method of claim 1, wherein the dictionary of terms further comprises words of one or more other dictionaries for a particular language.

5. The computer-implemented method of claim 1, wherein generating the dictionary of terms comprising terms associated with games of a collaboration platform comprises:
  identifying a set of the games of the collaboration platform;
  identifying terms in titles of the set of the games; and
  adding the terms in the titles of the set of the games to the dictionary of terms.

6. The computer-implemented method of claim 1, wherein identifying the first set of the search terms that are candidates to receive the search suggestions and the second set of the search terms that are to be the search suggestions based on the comparison comprises:
  responsive to determining that a first respective search term of the previous search queries is in the dictionary of terms, adding the first respective search term to the first set of the search terms; and
  responsive to determining that a second respective search term of the previous search queries is not in the dictionary of terms, adding the second respective search term to the second set of the search terms.

7. The computer-implemented method of claim 1, wherein identifying the second set of the search terms that are to be the search suggestions based on the comparison further comprises:
  validating the second set of the search terms that are to be the search suggestions, wherein a search term that is not validated is removed from the second set of the search terms and a search term that is validated is kept in the second set of the search terms.

8. The computer-implemented method of claim 7, wherein validating the second set of the search terms that are to be the search suggestions comprises:
  submitting a search query comprising a respective search term of the second set of the search terms;
  receiving a search result to the search query, the search result identifying one or more games of the collaboration platform;
  comparing a number of positive user feedback actions associated with the one or more games of the search results a second threshold number; and
  responsive to determining the number of positive user feedback actions associated with the one or more games of the search result is below the second threshold number, removing the respective search term from the second set of the search terms.

9. The computer-implemented method of claim 1, wherein generating the record that associates the candidate search terms of the first set of the search terms with the respective search suggestions of the second set of the search terms comprises:
  determining similarity scores that indicated a similarity between the candidate search terms of the first set of the search terms with the respective search suggestions of the second set of the search terms;
  comparing the similarity scores to a threshold similarity score; and
  responsive to determining that a similarity score associated with a particular candidate search term of the first set of the search terms and a particular respective search suggestion of the second set of the search terms exceeds the threshold similarity score, associating the particular candidate search term with the particular respective search suggestion in the record.

10. The computer-implemented method of claim 1, wherein identifying the plurality of search terms associated with the previous search queries of the collaboration platform comprises:
  determining a frequency of each of the search terms associated with the previous search queries over a second time period;
  comparing the frequency of each of the search terms to a second threshold frequency; and
  responsive to determining the frequency of a respective search term of the previous search queries is below the second threshold frequency, removing the respective search term from the search terms associated with the previous search queries.

11. A system comprising:
a memory; and
a processing device, coupled to the memory, the processing device configured to:
  generate a dictionary of terms comprising terms associated with games of a collaboration platform, wherein generating the dictionary of terms further comprises:
    identifying a set of the games of the collaboration platform, wherein identifying the set of the games of the collaboration platform comprises:
      determining a frequency each of the games has been played by users of the collaboration platform over a first time period;
      comparing the frequency of each of the games has been played over the first time period to a first threshold frequency; and
      responsive to the frequency of a respective one of the games exceeding the first threshold frequency, adding the respective game to the set of the games;
    identifying terms in titles of the set of the games; and
    adding the terms in the titles of the set of the games to the dictionary of terms;
  identify a plurality of search terms associated with previous search queries of the collaboration platform;
  compare the search terms with the dictionary of terms to determine whether the search terms associated with the previous search queries are in the dictionary of terms;
  identify a first set of the search terms that are candidates to receive search suggestions and a second set of the search terms that are to be the search suggestions based on the comparison; and
  generate a record that associates candidate search terms of the first set of the search terms with respective search suggestions of the second set of the search terms, wherein the record is used to provide a search suggestion for one or more new search terms of a new search query.

12. The system of claim 11, the processing device further configured to:
receive, from a user device, the new search query comprising the one or more new search terms;
identify the search term of the new search query as one of the candidates to receive the search suggestions in the record; and
responsive to identifying the search term as one of the candidates to receive search suggestions in the record, provide a respective search suggestion associated with the search term in the record to the user device.

13. The system of claim 11, wherein to generate the dictionary of terms comprising terms associated with games of a collaboration platform, the processing device is further configured to:
identify a set of the games of the collaboration platform;
identify terms in titles of the set of the games; and
add the terms in the titles of the set of the games to the dictionary of terms.

14. The system of claim 11, wherein to identify the first set of the search terms that are candidates to receive the search suggestions and the second set of the search terms that are to be the search suggestions based on the comparison, the processing device is further configured to:
responsive to determining that a first respective search term of the previous search queries is in the dictionary of terms, add the first respective search term to the first set of the search terms; and
responsive to determining that a second respective search term of the previous search queries is not in the dictionary of terms, add the second respective search term to the second set of the search terms.

15. The system of claim 11, wherein identifying the second set of the search terms that are to be the search suggestions based on the comparison further comprises:
validating the second set of the search terms that are to be the search suggestions, wherein a search term that is not validated is removed from the second set of the search terms and a search term that is validated is kept in the second set of the search terms, wherein the search term that is validated returns one or more search results corresponding to one or more games with a user rating that is above a predetermined rating threshold.

16. A non-transitory computer-readable medium comprising instruction that, responsive to execution by a processing device, cause the processing device to perform a method comprising:
generating a dictionary of terms comprising terms associated with games of a collaboration platform, wherein generating the dictionary of terms further comprises:
identifying a set of the games of the collaboration platform, wherein identifying the set of the games of the collaboration platform comprises:
determining a frequency each of the games has been played by users of the collaboration platform over a first time period;
comparing the frequency of each of the games has been played over the first time period to a first threshold frequency; and
responsive to the frequency of a respective one of the games exceeding the first threshold frequency, adding the respective game to the set of the games;
identifying terms in titles of the set of the games; and
adding the terms in the titles of the set of the games to the dictionary of terms;
identifying a plurality of search terms associated with previous search queries of the collaboration platform;
comparing the search terms with the dictionary of terms to determine whether the search terms associated with the previous search queries are in the dictionary of terms;
identifying a first set of the search terms that are candidates to receive search suggestions and a second set of the search terms that are to be the search suggestions based on the comparison; and
generating a record that associates candidate search terms of the first set of the search terms with respective search suggestions of the second set of the search terms, wherein the record is used to provide a search suggestion for one or more new search terms of a new search query.

17. The non-transitory computer-readable medium of claim 16, the method further comprising:
receiving, from a user device, the new search query comprising the one or more new search terms;
identifying the search term of the new search query as one of the candidates to receive the search suggestions in the record; and
responsive to identifying the search term as one of the candidates to receive search suggestions in the record, providing a respective search suggestion associated with the search term in the record to the user device.

18. The non-transitory computer-readable medium of claim 16, wherein identifying the plurality of search terms associated with the previous search queries of the collaboration platform comprises:
determining a frequency of each of the search terms associated with the previous search queries over a second time period;
comparing the frequency of each of the search terms to a second threshold frequency; and
responsive to determining the frequency of a respective search term of the previous search queries is below the second threshold frequency, removing the respective search term from the search terms associated with the previous search queries.

19. The non-transitory computer-readable medium of claim 16, wherein generating the record that associates the candidate search terms of the first set of the search terms with the respective search suggestions of the second set of the search terms, the method further comprising:
determining similarity scores that indicated a similarity between the candidate search terms of the first set of the search terms with the respective search suggestions of the second set of the search terms;
comparing the similarity scores to a threshold similarity score; and
responsive to determining that a similarity score associated with a particular candidate search term of the first set of the search terms and a particular respective search suggestion of the second set of the search terms exceeds the threshold similarity score, associating the particular candidate search term with the particular respective search suggestion in the record.

20. The non-transitory computer-readable medium of claim 16, wherein identifying the second set of the search terms that are to be the search suggestions based on the comparison further comprises:

validating the second set of the search terms that are to be the search suggestions, wherein a search term that is not validated is removed from the second set of the search terms and a search term that is validated is kept in the second set of the search terms, wherein validating the second set of the search terms that are to be the search suggestions comprises:

submitting a search query comprising a respective search term of the second set of the search terms, receiving a search result in response to the search query, the search result identifying one or more games of the collaboration platform, comparing a number of positive user feedback actions associated with the one or more games of the search results a second threshold number, and responsive to determining that the number of positive user feedback actions associated with the one or more games of the search result is below the second threshold number, removing the respective search term from the second set of the search terms.

\* \* \* \* \*